United States Patent
Wu

(10) Patent No.: US 8,953,556 B2
(45) Date of Patent: Feb. 10, 2015

(54) METHOD OF TRANSMITTING AND HANDLING COUNTINGRESPONSE MESSAGE AND RELATED COMMUNICATION DEVICE

(75) Inventor: Chih-Hsiang Wu, Taoyuan County (TW)

(73) Assignee: HTC Corporation, Taoyuan, Taoyuan County (TW)

(*) Notice: Subject to any disclaimer, the term of this patent is extended or adjusted under 35 U.S.C. 154(b) by 494 days.

(21) Appl. No.: 13/275,312

(22) Filed: Oct. 18, 2011

(65) Prior Publication Data

US 2012/0093126 A1 Apr. 19, 2012

Related U.S. Application Data

(60) Provisional application No. 61/393,948, filed on Oct. 18, 2010.

(51) Int. Cl.
| | |
|---|---|
| *H04W 4/00* | (2009.01) |
| *H04W 4/06* | (2009.01) |
| *H04L 29/06* | (2006.01) |
| *H04W 72/00* | (2009.01) |
| *H04W 12/00* | (2009.01) |
| *H04W 36/08* | (2009.01) |

(52) U.S. Cl.
CPC .............. *H04W 4/06* (2013.01); *H04L 63/20* (2013.01); *H04W 72/005* (2013.01); *H04W 12/00* (2013.01); *H04W 36/08* (2013.01)
USPC ........................................................ 370/331

(58) Field of Classification Search
None
See application file for complete search history.

(56) References Cited

U.S. PATENT DOCUMENTS

| 7,477,619 | B2 | 1/2009 | Lee | |
|---|---|---|---|---|
| 2006/0034204 | A1* | 2/2006 | Lee et al. | 370/312 |
| 2007/0172068 | A1* | 7/2007 | Herrmann | 380/278 |
| 2009/0131063 | A1* | 5/2009 | Yi et al. | 455/450 |
| 2009/0291703 | A1* | 11/2009 | Wang | 455/518 |
| 2011/0319011 | A1* | 12/2011 | Dong et al. | 455/3.01 |

FOREIGN PATENT DOCUMENTS

| CN | 101682848 A | 3/2010 |
|---|---|---|
| EP | 1986376 A1 | 10/2008 |
| EP | 2 442 591 A3 | 5/2012 |
| JP | 2007501584 A | 1/2007 |
| KR | 1020060026881 A | 3/2006 |
| KR | 100964679 B1 | 6/2010 |
| WO | 2004102901 A1 | 11/2004 |
| WO | 2008133479 A1 | 11/2008 |

OTHER PUBLICATIONS

3GPP TSG-RAN WG2 Meeting #71bis R2-105975 "Stage-3 CR for MBMS enhancement", Oct. 2010.

(Continued)

*Primary Examiner* — Dang Ton
*Assistant Examiner* — Ronald h Davis
(74) *Attorney, Agent, or Firm* — Winston Hsu; Scott Margo

(57) ABSTRACT

A method of transmitting CountingResponse message for a mobile device in a wireless communication system is disclosed. The method comprises steps of receiving a CountingRequest message from a network; activating security between the mobile device and a network in the wireless communication system; and transmitting a CountingResponse message to the network.

5 Claims, 6 Drawing Sheets

(56) References Cited

OTHER PUBLICATIONS

3GPP TS 36.300 v10.0.0, Jun. 2010.
3GPP TS 36.331 v9.4.0, Sep. 2010.
Office Action mailed on Feb. 19, 2013 for the Japanese application No. 2011-229205, filing date Oct. 18, 2011, pp. 1-3.
Nokia Siemens Networks, Nokia Corporation, "Discussion of SecurityModeCommand delayed L2 Ack problem", 3GPP TSG-RAN WG2 Meeting #70bis, R2-103910, Jun. 28-Jul. 2, 2010, Stockholm, Sweden, p. 1-4.
Office action mailed on Dec. 9, 2013 for the China application No. 201110317645.4, filing date Oct. 18, 2011.
Notice of allowance mailed on Jul. 5, 2013 for the Korean application No. 10-2011-0106394, filing date: Oct. 18, 2011, pp. 1-2.
European patent application No. 11008367.2, European Search Report mailing date: May 2, 2012.
Armando Soares et al., "UE Counting Mechanism for MBMS Considering PtM Macro Diversity Combining Support in UMTS Networks", 2006, p. 361-365, IEEE Ninth International Symposium on Spread Spectrum Techniques and Applications.
European patent application No. 11008367.2, European Search Report mailing date: Mar. 2, 2012.
Nokia, "Providing integrity to counting Idle mode UE", 3GPP TSG RAN WG2 #34, Tdoc RAN WG2 R2-030120, Feb. 17-21, 2003, Sophia Antipolis, France, XP050122830, p. 1-4.
Qualcomm Europe, "Adding Integrity to Counting Idle Mode terminals in MBMS", 3GPP TSG SA WG3 Security-S3#31, S3-030696, Nov. 18-21, 2003, Munich, Germany, XP050274675, p. 1-2.
ETSI TS 125 346 V9.1.0 (Apr. 2010), "Universal Mobile Telecommunications System (UMTS); Introduction of the Multimedia Broadcast/Multicast Service (MBMS) in the Radio Access Network (RAN); Stage 2 (3GPP TS 25.346 version 9.1.0 Release 9)", XP014046586, cover page + p. 1-72.

\* cited by examiner

US 8,953,556 B2

METHOD OF TRANSMITTING AND HANDLING COUNTINGRESPONSE MESSAGE AND RELATED COMMUNICATION DEVICE

CROSS REFERENCE TO RELATED APPLICATIONS

This application claims the benefit of U.S. Provisional Application No. 61/393,948, filed on Oct. 18, 2010 and entitled "Method and Apparatus for transmitting Counting-Response in a wireless communication system", the contents of which are incorporated herein by reference.

BACKGROUND OF THE INVENTION

1. Field of the Invention

The present invention relates to a method used in a wireless communications system and related communication device, and more particularly, to a method of transmitting and handling CountingResponse message in a wireless communication system and related communication device.

2. Description of the Prior Art

To enhance multimedia performance of the 3G mobile telecommunications system, the 3rd Generation Partnership Project (3GPP) introduces a Multimedia Broadcast Multicast Service (MBMS), which is a point-to-multipoint bearer service established on a long-term evolution (LTE) system. MBMS allows a single source terminal, to simultaneously transmit data to multiple user equipments (UEs).

The MBMS introduces a single frequency network (SFN) operation for MBMS transmission, i.e. MBMS Single Frequency Network (MBSFN), to reduce service interruption due to mobility between cells during transmissions. In MBSFN, single frequency is used by multiple cells to perform synchronized transmission at the same time. An area of the network where all eNodeBs can be synchronized and perform MBSFN transmissions. MBSFN Synchronization Areas are capable of supporting one or more MBSFN Areas. An MBSFN Area consists of a group of cells within an MBSFN Synchronization Area of a network, which are co-ordinated to achieve an MBSFN Transmission. An MBSFN Transmission from multiple cells within the MBSFN Area is seen as a single transmission by a UE.

Besides, two logical channels are defined in MBMS to support point-to-multipoint (p-t-m) downlink transmission: Multicast Control Channel (MCCH) and Multicast Traffic Channel (MTCH). MCCH is utilized for transmitting control messages of all MBMS services in an MBSFN area, and MTCH is utilized for transmitting session data of an MBMS service. The session data relates to contents of the MBMS service. Both MCCH and MTCH are mapped to a transmission channel newly defined by MBMS, i.e. Multicast Channel (MCH).

In addition, a counting procedure is used by a network to count a number of RRC CONNECTED mode UEs which are receiving or interested in a MBMS service. That is, the network initiates a counting procedure by transmitting a CountingRequest message corresponding to a MBMS service on MCCH. Security is UE specific and the CountingRequest message transmitted on the MCCH is not only for a specific UE so the network cannot activate the security to protect the CountingRequest message (e.g. cipher the CountingRequest message or have integrity protection of the CountingRequest message). In other words, the network broadcasts the CountingRequest message. Upon receiving the CountingRequest message, UEs in RRC_CONNECTED mode receiving or interested in the MBMS service respond CountingResponse messages to the network. The CountingResponse message is transmitted on Dedicated Control Channel (DCCH). Therefore, when providing the MBMS service, the network can decide to broadcast or unicast the MBMS service to the UEs receiving or interested in the MBMS service according to whether a number of UEs receiving or interested in the specified MBMS service is greater than a predefined number. A UE determines interest in an MBMS service, that is identified by the Temporary Mobile Group Identity (TMGI), by interaction with upper layers of RRC.

However, in the prior art, it is not specified when a UE sends a CountingResponse message to a network. For example, a UE may send the CountingResponse message before a network activates security. Malicious UEs may send CountingResponse messages to confuse the network for MBMS counting and the network inefficiently configures radio resources for transmitting MBMS services, e.g. the malicious UEs may mislead the network that there are more UEs receiving or interested in a specified MBMS service than actually are since security is not activated to authenticate a CountingResponse message and UE thereof, and thus the network broadcasts the specified MBMS service to the UEs rather than unicasting the specified MBMS service to the UEs economically. Thus, the counting procedure may not be performed correctly, and thus radio resources may not be utilized economically.

Besides, the UE may send the CountingResponse message during a RRC procedure. For example, the UE may send the CountingResponse message after receiving a RRCConnectionSetup message and before transmitting a RRCConnectionSetupComplete message; the UE may send the CountingResponse message after receiving a RRCConnectionReconfiguration message (e.g. for handover) and before transmitting a RRCConnectionReconfigurationComplete message; and the UE may send the CountingResponse message after receiving a RRCConnectionReestablishment message and before transmitting a RRCConnectionReestablishmentComplete message. Under the above situation, the network may not be able to handle the CountingResponse message during an ongoing RRC procedure since the network can not determine whether the UE completes the ongoing RRC procedure, i.e. a status of the UE, without receiving a complete message of the ongoing RRC procedure. Thus, the counting procedure may not be performed correctly.

Moreover, a UE normally sends a CountingResponse message to an eNB when the UE receives a CountingRequest message. Under such a situation, the UE may receive the CountingRequest message in a first eNB and send the CountingResponse message to a second eNB which may not support MBMS counting due to handover to or RRC connection re-establishment with the second eNB. In other words, before the UE sends a CountingResponse message to the first eNB, the UE moves to the second eNB due to handover or RRC connection re-establishment, and thus sends the CountingResponse message to the second eNB. The CountingResponse message may make the second eNB system crash or take error handling (e.g. release the UE RRC connection). Thus, the counting procedure may not be performed correctly.

SUMMARY OF THE INVENTION

The disclosure therefore provides a method and related communication device for transmitting and handling CountingResponse message.

A method of transmitting CountingResponse message for a mobile device in a wireless communication system is disclosed. The method comprises steps of receiving a CountingRequest message from a network, activating security between the mobile device and the network in the wireless communication system; and transmitting a CountingResponse message to the network.

A method of handling CountingResponse message for a network in a wireless communication system is disclosed. The method comprises steps of receiving a CountingResponse message from a mobile device in the wireless communication system; and ignoring the CountingResponse message if not activating security for the mobile device.

A method of transmitting CountingResponse message for a mobile device in a wireless communication system is disclosed. The method comprises steps of receiving a first CountingRequest message from a first network in the wireless communication system; not successfully transmitting a first CountingResponse message to the first network due to handover to or re-establishment with a second network in the wireless communication system; and transmitting a second CountingResponse message to the second network when receiving a second CountingRequest message from the second network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
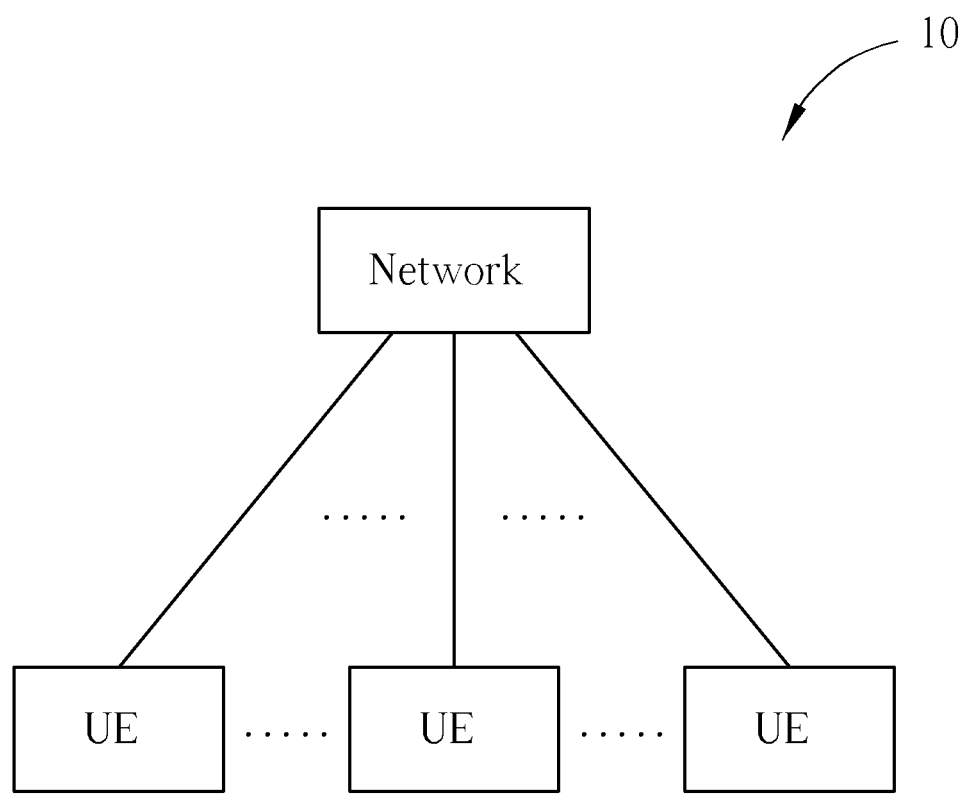
FIG. 1 is a schematic diagram of an exemplary wireless communication system.

Please refer to FIG. 1. FIG. 1 is a schematic diagram of an exemplary wireless communication system 10. The wireless communication system 10 can be an LTE-Advanced system, or other mobile communication systems (e.g. LTE, WCDMA, HSPA, GSM, EDGE, etc.). The wireless communication system 10 is briefly composed of a network and a plurality of user equipments (UEs), as the structure illustrated in FIG. 1. In the LTE-Advanced system, the network is referred as an evolved universal terrestrial radio access network (E-UTRAN) comprising a plurality of evolved base stations (eNBs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
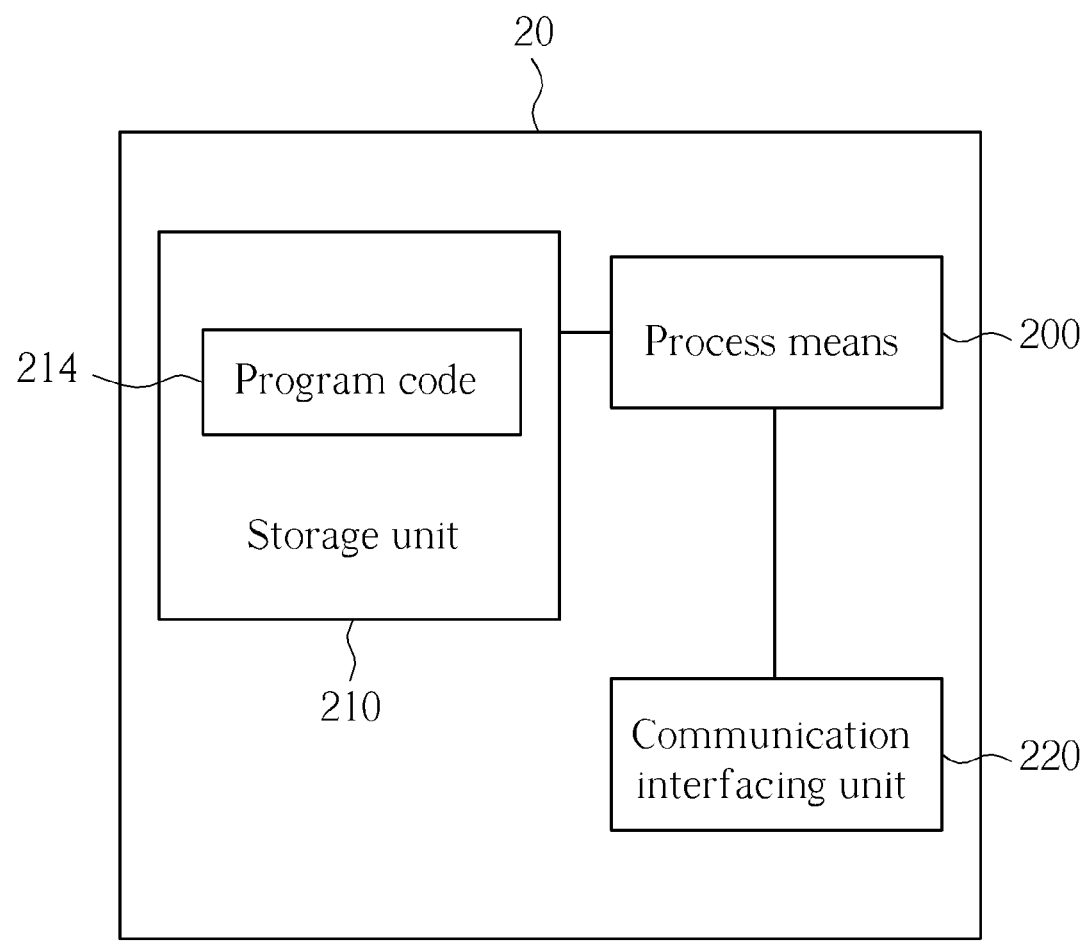
FIG. 2 is a schematic diagram of an exemplary communication device.

Please refer to FIG. 2. FIG. 2 is a schematic diagram of an exemplary communication device 20. The communication device 20 can be the UE or the network shown in FIG. 1 and may include a processing means 200 such as a microprocessor or ASIC, a memory unit 210, and a communication interfacing unit 220. The memory unit 210 may be any data storage device that can store program code 214 for access by the processing means 200. Examples of the memory unit 210 include but are not limited to a subscriber identity module (SIM), read-only memory (ROM), random-access memory (RAM), CD-ROMs, magnetic tapes, floppy disks, and optical data storage devices. The communication interfacing unit 220 is preferably a radio transceiver for wirelessly communicating with the network according to processing results of the processing means 200.

Figure 3:
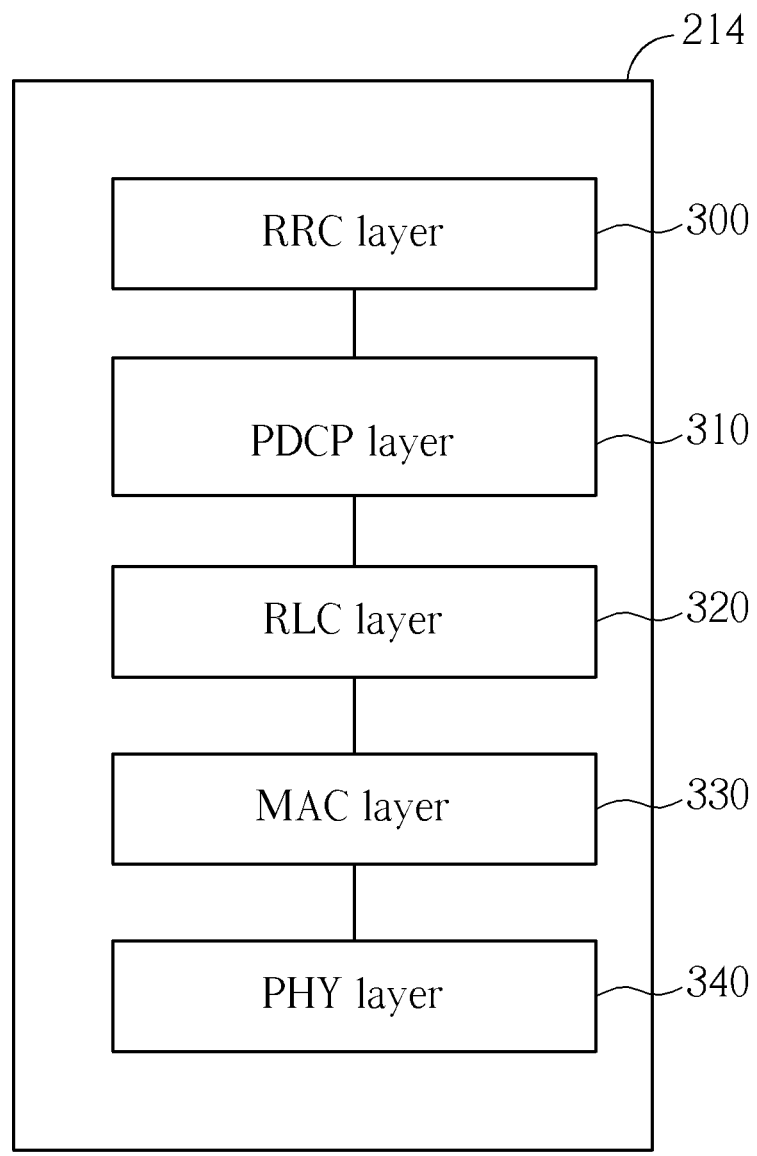
FIG. 3 illustrates the program code in FIG. 2.

Please refer to FIG. 3, which illustrates the program code 214 in FIG. 2. The program code 214 includes program code of multiple communications protocol layers, which from top to bottom are a radio resource control (RRC) layer 300, a packet data convergence protocol (PDCP) layer 310, a radio link control (RLC) layer 320, a medium access control (MAC) layer 330 and a physical (PHY) layer 340. The PHY layer 340 includes physical channels, such as Physical Random Access Channel (PRACH), Physical Uplink Control Channel (PUCCH), Physical Uplink Shared Channel (PUCCH), Physical Downlink Control Channel (PDCCH), Physical Downlink Shared Channel (PDCCH).

The LTE-A system may support a Multimedia Broadcast Multicast Service (MBMS), which allows a single source terminal, to simultaneously transmit data to multiple UEs. In such a situation, the embodiments of the present invention provide the program code 214 for the UE or the network to correctly transmitting and handling CountingResponse message, to correctly perform the counting procedure and economically utilize radio resources.

Figure 4:
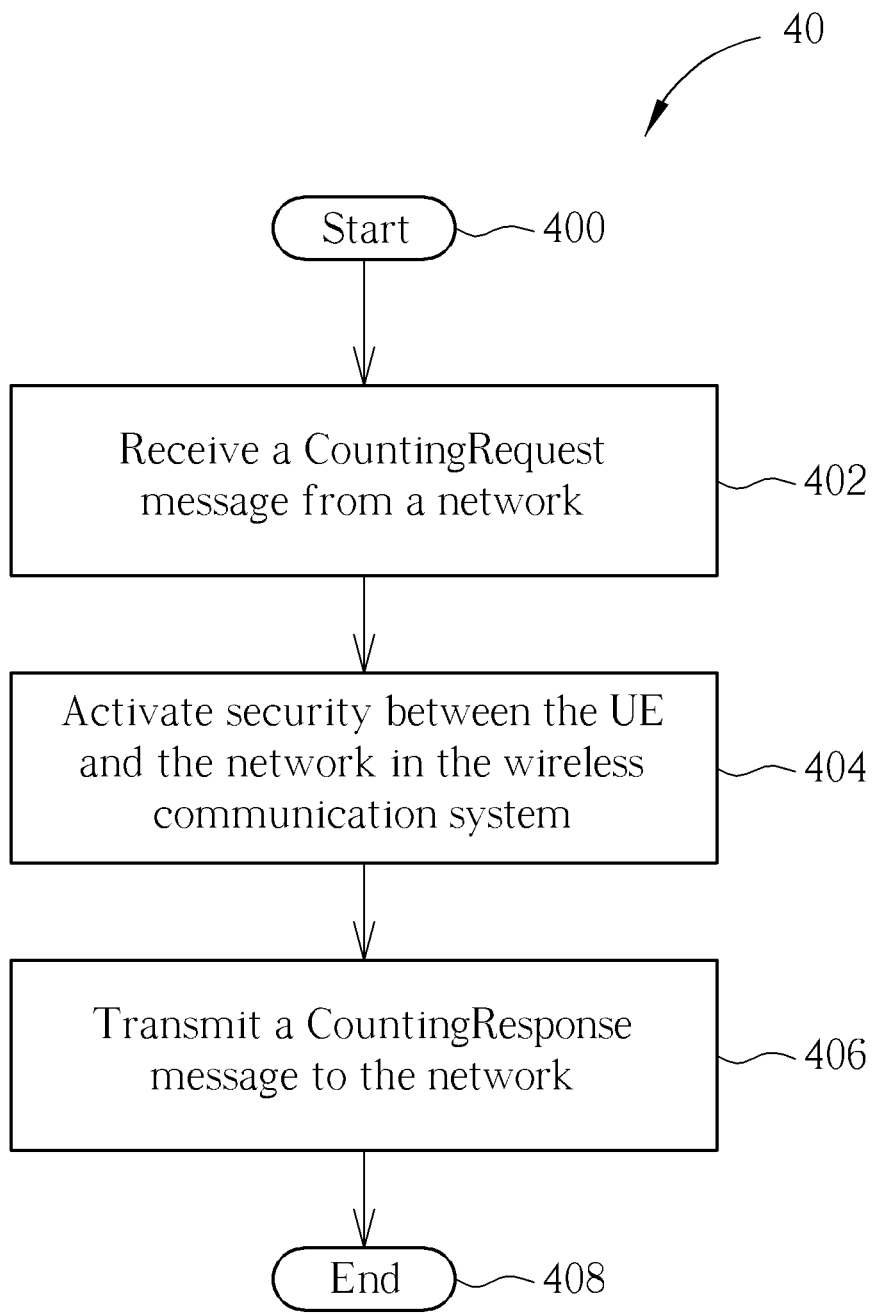
FIG. 4 is a flow chart of a process according to an embodiment of the present invention.

Please refer to FIG. 4, which is a flow chart of a process 40 according to an embodiment of the present invention. The process 40 is used for transmitting CountingResponse message for a UE in a wireless communication system. The wireless communication system could be the wireless communication system 10. The process 40 can be compiled into the program code 214 and includes the following steps:

Step 400: Start.

Step 402: Receive a CountingRequest message from a network.

Step 404: Activate security between the UE and the network in the wireless communication system.

Step 406: Transmit a CountingResponse message to the network.

Step 408: End.

According to the process 40, after the UE receives a CountingRequest message from a network and activates security between the UE and the network in the wireless communication system, the UE transmits a CountingResponse message to the network, wherein the UE can receive the CountingRequest message on MCCH from the network and transmit the CountingResponse message to the network on DCCH to the network. In other words, the UE is only allowed to transmit the CountingResponse message to the network when/after the security is activated between the UE and the network, e.g. receiving a SecurityModeCommand message from the network or transmitting a SecurityModeComplete message to the network. Under such a situation, the UE has to wait until the security is activated between the UE and the network such that the network can know the CountingResponse message is transmitted from the specific UE without being confused by malicious UEs. As a result, the present invention can correctly perform the counting procedure and economically utilize radio resources.

Besides, the UE does not transmit the CountingResponse message to the network during a radio resource control (RRC) procedure, e.g. an RRC connection establishment, an RRC connection reconfiguration and an RRC connection re-establishment. In other words, the UE is only allowed to transmit the CountingResponse message to the network after finishing the RRC procedure. Under such a situation, the network first receives a complete message of the RRC procedure, and thus can acknowledge a status of the UE, such that the network can correctly handle the CountingResponse message. As a result, the present invention can correctly perform the counting procedure.

Figure 5:
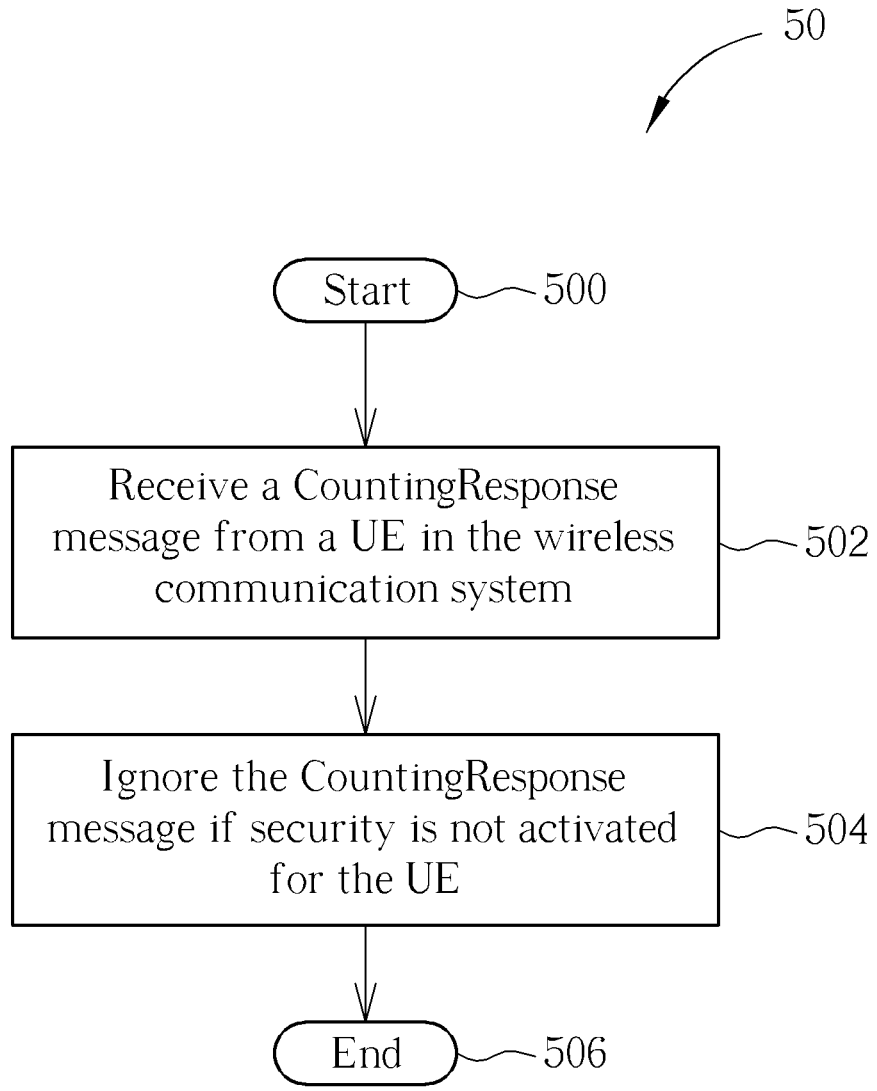
FIG. 5 is a flow chart of a process according to an embodiment of the present invention.

Please refer to FIG. 5, which is a flow chart of a process 50 according to an embodiment of the present invention. The process 50 is used for handling CountingResponse message for a network in a wireless communication system. The wireless communication system could be the wireless communication system 10. The process 50 can be compiled into the program code 214 and includes the following steps:

Step 500: Start.

Step 502: Receive a CountingResponse message from a UE in the wireless communication system.

Step 504: Ignore the CountingResponse message if security is not activated for the UE.

Step 506: End.

According to the process 50, the network receives a CountingResponse message from a UE in the wireless communication system, and ignores the CountingResponse message if the network does not activate security for the UE. In other words, the network does not take the content in the CountingResponse message into account for MBMS counting since the CountingResponse message is not passed security authentication. Under such a situation, malicious UEs can not send CountingResponse messages to confuse the network since the CountingResponse messages are either authenticated by the security or ignored. As a result, the present invention can correctly perform the counting procedure and economically utilize radio resources.

Figure 6:
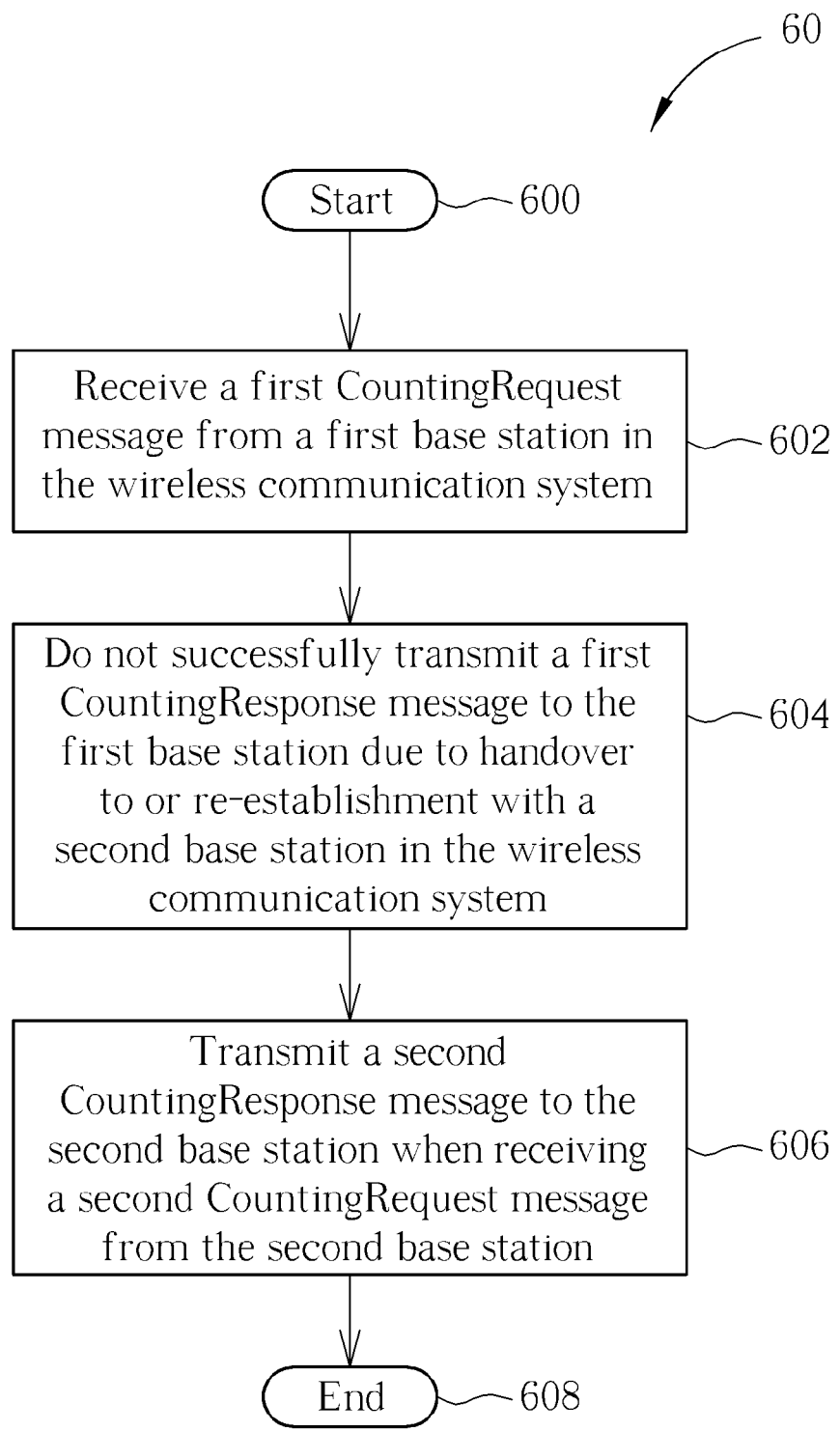
FIG. 6 is a flow chart of a process according to an embodiment of the present invention.

Please refer to FIG. 6, which is a flow chart of a process 60 according to an embodiment of the present invention. The process 60 is used for transmitting CountingResponse message for a UE in a wireless communication system. The wireless communication system could be the wireless communication system 10. The process 60 can be compiled into the program code 214 and includes the following steps:

Step 600: Start.

Step 602: Receive a first CountingRequest message from a first base station in the wireless communication system.

Step 604: Do not successfully transmit a first CountingResponse message to the first base station due to handover to or re-establishment with a second base station in the wireless communication system.

Step 606: Transmit a second CountingResponse message to the second base station when receiving a second CountingRequest message from the second base station.

Step 608: End.

According to the process 60, if the UE receives a first CountingRequest message from a first base station in the wireless communication system, i.e. an eNB in the LTE system, and does not successfully transmit a first CountingResponse message to the first base station due to handover to or re-establishment with a second base station in the wireless communication system. After the handover or re-establishment, the UE transmits a second CountingResponse message to the second base station when receiving a second CountingRequest message from the second base station, i.e. the UE does not spontaneously transmit the first CountingResponse message for the first base station to the second base station, to prevent the second base station from crash or error handling, e.g. releasing the UE RRC connection, due to the unknown first CountingResponse message.

Noticeably, if the second base station is the same as the first base station, i.e. intra-handover, since the second base station can recognize a CountingResponse message from the UE, the UE can spontaneously transmit a third CountingResponse message to the second base station after handover to or re-establishment with the second base station, wherein the third CountingResponse message can be the same as the first CountingResponse message. As a result, the present invention can correctly perform the counting procedure.

Please note that the abovementioned steps including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20 in which the processing means 200 processes the program code 214 related to the abovementioned processes and the processed results can enhance uplink transmission in the wireless communications system 10.

In the prior art, since the timing for the UE to send a CountingResponse message to a network is not specified, the counting procedure may not be performed correctly or radio resources may not be utilized economically under some circumstances, e.g. when the UE sends the CountingResponse message before a network activates security, the UE sends the CountingResponse message during a RRC procedure, or the UE receives a CountingRequest message from a first eNB but sends a CountingResponse message to a second eNB after handover to or re-establishment with the second eNB.

In comparison, in an embodiment of the present invention, the UE transmits a CountingResponse message to the network when/after the security is activated between the UE and the network, such that the network can perform the counting procedure and economically utilize radio resources. Moreover, the UE does not transmit the CountingResponse message to the network during a RRC procedure, such that the network can correctly perform the counting procedure. In another embodiment of the present invention, the network ignores the CountingResponse message received from a UE if the network does not activate security for the UE, to correctly perform the counting procedure and economically utilize radio resources. In a further embodiment, after handover or re-establishment, the UE does not spontaneously transmit the first CountingResponse message for the first base station to the second base station if the second base station is different from the first base station, and spontaneously transmits a third CountingResponse message, e.g. the same as the first CountingResponse message, to the second base station if the second base station is different from the first base station, to correctly perform the counting procedure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of transmitting CountingResponse message for a mobile device in a wireless communication system, the method comprising:

receiving a CountingRequest message for counting a number of mobile devices which are receiving or interested in a MBMS service from a network;

activating security between the mobile device and the network in the wireless communication system for the network to authenticate and identify messages sent by the mobile device; and encrypting a CountingResponse message and transmitting the CountingResponse message to the network, wherein the step of transmitting the CountingResponse message to the network comprises not transmitting the CountingResponse message to the network during a radio resource control (RRC) procedure and transmitting the CountingResponse message to the network after the RRC procedure;

wherein the step of activating the security between the mobile device and the network in the wireless communication system comprises:

receiving a SecurityModeCommand message from the network; and transmitting a SecurityModeComplete message to the network in response to the received SecurityModeCommand message.

2. The method of claim 1, wherein the RRC procedure is one of an RRC connection establishment, an RRC connection reconfiguration and an RRC connection re-establishment.

3. The method of claim 1, wherein the step of receiving the CountingRequest message from the network comprises:

receiving the CountingRequest message on MCCH from the network.

4. The method of claim 1, wherein the step of transmitting a CountingResponse message to the network comprises:

transmitting a CountingResponse message on DCCH to the network.

5. A method of handling CountingResponse message for a network in a wireless communication system, the method comprising:

transmitting a CountingRequest message for counting a number of mobile devices which are receiving or interested in a MBMS service;

receiving a CountingResponse message from a mobile device in the wireless communication system; and ignoring the CountingResponse message if the CountingResponse message is received before activating security for the mobile device to authenticate and identify messages sent by the mobile device;

wherein the step of activating the security comprises:

transmitting a SecurityModeCommand message to the mobile device; and receiving a SecurityModeComplete message from the mobile device after the SecurityModeCommand message has been transmitted.

* * * * *